United States Patent [19]

Chronowski et al.

[11] 4,382,756
[45] May 10, 1983

[54] BEARING AND SEAL ASSEMBLY FOR A HYDRAULIC PUMP

[75] Inventors: Thomas G. Chronowski, Flint; Paul O. Wendler, Saginaw, both of Mich.

[73] Assignee: General Motors Corporation, Detroit, Mich.

[21] Appl. No.: 271,659

[22] Filed: Jun. 8, 1981

[51] Int. Cl.³ .......................... F04C 2/00; F04C 15/00
[52] U.S. Cl. .................................. 418/133; 418/104; 308/187.2
[58] Field of Search ............... 418/104, 131, 132, 133; 308/187.1, 187.2

[56] References Cited

U.S. PATENT DOCUMENTS

| | | | |
|---|---|---|---|
| 2,044,380 | 6/1936 | Cobb | 308/187.1 |
| 3,173,374 | 3/1965 | Beimfohr | 418/131 |
| 3,479,100 | 11/1969 | Pitner | 308/187.2 |
| 3,612,547 | 10/1971 | Kan | 308/187.1 |
| 3,856,368 | 12/1974 | Andersen | 308/187.2 |

FOREIGN PATENT DOCUMENTS 1442897 7/1976 United Kingdom ................ 418/132

Primary Examiner—John J. Vrablik
Attorney, Agent, or Firm—Donald F. Scherer

[57] ABSTRACT

A bearing and seal assembly for use in a hydraulic pump has a housing with a stepped outer diameter. The smaller diameter encloses a roller bearing and is adapted to sealingly seat in the pump housing. The larger diameter is disposed within the pump housing and encloses a seal member adapted to sealingly contact a stationary internal pump component so as to cooperate therewith in sealing against leakage of high pressure fluid from the pump. A shoulder between the stepped diameters abuts a radial inner wall of the pump housing. The high pressure fluid within the pump acts on the seal end of the assembly thereby urging the shoulder to remain in abutment and assist in sealing against fluid leakage.

2 Claims, 1 Drawing Figure

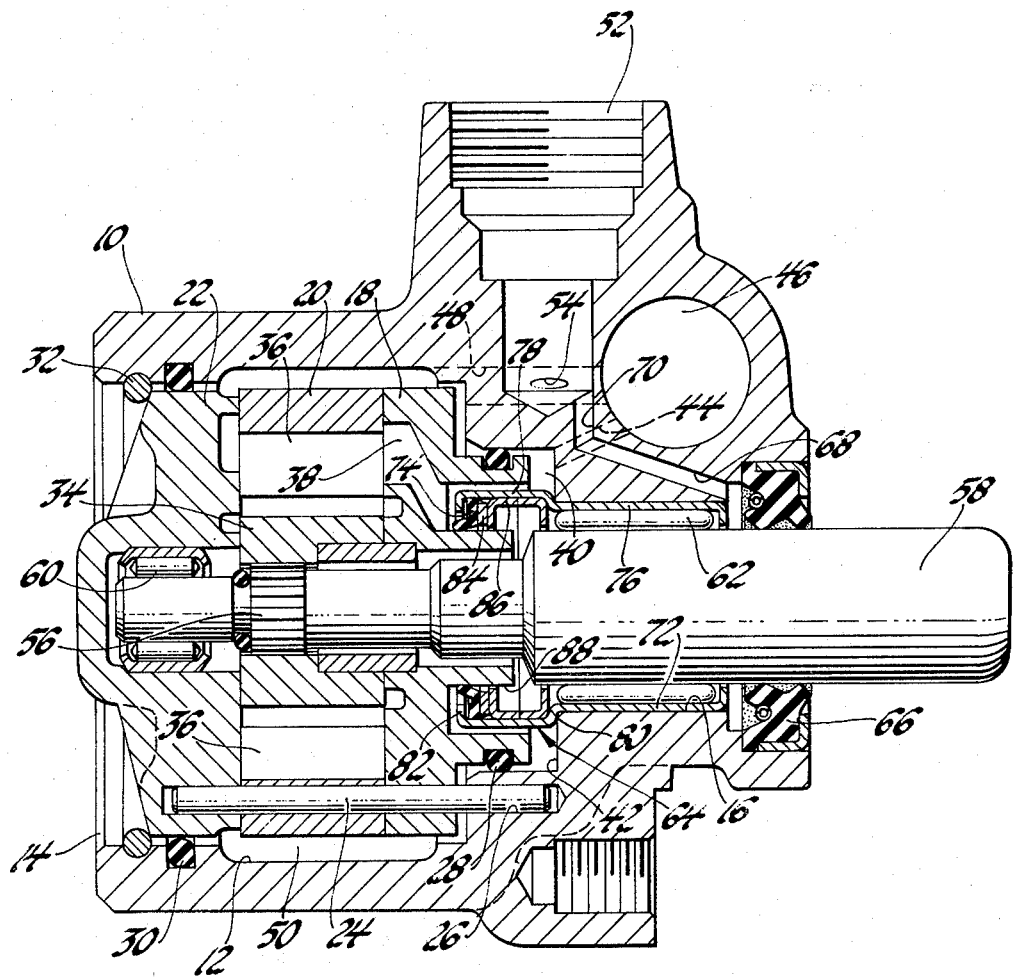

BEARING AND SEAL ASSEMBLY FOR A HYDRAULIC PUMP

This invention relates to bearing and seal structures and more particularly to such structures used with high pressure hydraulic pumps.

It is an object of this invention to provide an improved bearing and seal assembly for use with a hydraulic pump wherein the assembly has a housing member with a stepped outer diameter which encloses a bearing and a seal in the small and large diameter portions, respectively, and wherein an annular shoulder between the diameters abuts the pump housing and is maintained in abutment by the hydraulic pressure in the pump acting on the large annular end of the assembly adjacent the seal.

It is another object of this invention to provide an improved bearing and seal assembly for use with a hydraulic pump wherein the pump has a housing, a rotatable drive shaft and a stationary internal component and wherein the bearing and seal assembly includes a housing with a stepped outer diameter surface and encloses a roller bearing supporting the shaft and a seal member sealingly engaging the stationary member with the bearing and seal member being disposed in the small and large diameter portions, respectively. The small diameter portion is supported in the housing and the large diameter portion extending axially into the housing such that high pressure fluid acting on the seal at the large annular end of the housing enforces abutment of a shoulder structure, formed by an annular surface between the housing diameters, against the pump housing.

These and other objects and advantages of the present invention will be more apparent from the following description and drawing which is a cross-sectional elevational view of a hydraulic pump incorporating a bearing and seal assembly.

The hydraulic pump includes a housing 10 having a cylindrical cavity 12 which has a large opening 14 at one end and a shaft opening 16 at the other end. The cylindrical cavity 12 houses a pressure plate 18, a cam ring 20 and a thrust plate 22 which are maintained in axial and angular alignment by a plurality of dowel pins such as 24. The dowel pins 24 are positioned in openings 26 formed in the housing 10.

The pressure plate 18 and thrust plate 22 cooperate with annular seals 28 and 30, respectively, to provide a sealing structure between the plates and the pump housing. The thrust plate 22 is limited in its leftward movement by a locking or retaining ring 32. One or more spring members, not shown, extend between the pressure plate 18 and the housing 10 so as to urge the two plates 18 and 22 and the cam ring 20 leftward against the locking ring 32.

A rotor 34 is rotatably disposed within the cam ring 20 and has associated therewith a plurality of radially slidable vanes 36 which cooperate with the rotor 34, cam ring 20 and plates 18 and 22 to provide a plurality of pump chambers which expand and contract in a well-known manner as the rotor 34 is rotated.

The fluid expelled from the pump chambers passes through passages, such as 38, formed in the pressure plate 18, which passages 38 are in fluid communication with a high pressure chamber 40 formed between the right end of pressure plate 18 and an annular wall 42. The pressure chamber 40 is connected by a passage 44 with a conventional flow control valve 46 which, as is well-known, distributes a predetermined amount of hydraulic fluid to a power steering system. The excess fluid flow is redirected by the flow control valve 46 through a passage 48 to a pump inlet chamber 50 surrounding the cam ring 20 and sealed from chamber 40 by seal ring 28 and from atmosphere by seal ring 30. The fluid delivered to the power system returns either to a remote reservoir or directly to an inlet port 52 formed in the housing 10. The inlet port 52 is in fluid communication through an opening 54 of the passage 48.

The rotor 34 is drivingly connected through a spline 56 to a pump drive shaft 58. The pump drive shaft is adapted to be connected to a prime mover such as an internal combustion engine. The drive shaft 58 is rotatably supported in a roller bearing 60 disposed in the thrust plate 22 and in a roller bearing 62 disposed in a bearing and seal assembly, generally designated 64. The drive shaft 58 cooperates with a seal assembly 66 to prevent bearing lube flow from escaping to atmosphere. The pump side of seal 66 is connected through passages 68 and 70 to the inlet port 52.

The bearing and seal assembly 64 includes the roller bearing 62, a housing 72 and a seal member 74. The housing 72 has a stepped outer diameter including a small diameter portion 76 and a large diameter portion 78. An annular shoulder 80 is formed between these diameter portions 76 and 78 and is placed in abutment with the wall 42 during assembly. The left end of housing 72 is upset to form an annular flange 82 which cooperates with an annular backing plate 84 and an annular spacer 86 to position the seal 74 within the housing 72. The seal 74 may be a lip type seal as shown, or other annular seal member. The inner portion of seal 74 sealingly engages a cylindrical surface 88 formed on the pressure plate 18.

The seal 74 and seal 28 cooperate to form the outer boundaries of high pressure chamber 40. Therefore, the annular flange 82 and the end face of seal 74 are subjected to the high pressure hydraulic fluid within the pump. The high pressure urges the bearing and seal assembly 64 rightward so that increased abutment force occurs between shoulder 80 and the wall 42. This prevents the seal assembly from migrating out of the shaft opening 16. Thus, the bearing and seal assembly 64 can be installed in the shaft opening 16 with a line-to-line or light press fit so as to provide some sealing effect. When this sealing is combined with the abutment between wall 42 and shoulder 80, fluid leakage between the outer surface of the small diameter 76 and the shaft opening 16 is substantially eliminated. Should a small amount of leakage occur, the fluid would be collected adjacent the seal 66 and returned to the main system fluid through passage 68.

The bearing and seal assembly as well as all of the other pump components can be assembled through the large opening 14 prior to installation of the locking ring 32. The only component which cannot be assembled from this end of the pump is the seal assembly 66. Thus, the majority of the pump components can be preassembled and stored prior to installation within the pump housing 10 such that inventorying of various displacement pump structures do not necessitate the storage of a housing also. The bearing and seal assembly 64 simplifies the sealing necessary to provide the high pressure chamber 40 and provided improved rotary support for the pump shaft 58. The back plate 84 and spacer 86 are shown as separate components. This was done primarily for convenience of manufacture. In the alternative, these components could be formed integrally with the housing 72.

It will be obvious to those skilled in the art that the bearing and seal assembly can have the housing made by various manufacturing processes. The significant and important feature of the bearing housing is that it have a stepped outer diameter so that the abutment and sealing shoulder 80 is provided. Further, the annular end adjacent the seal must be larger than the bearing portion so that pressure balance urging the shoulder 80 into abutment is present.

The embodiments of the invention in which an exclusive property or privilege is claimed are defined as follows:

1. In combination, a high pressure hydraulic pump and a bearing and seal assembly comprising, a stationary pump housing, a nonrotatable pressure plate, a rotatable drive shaft, a bearing case having a stepped diameter outer cylindrical surface with a shoulder area between said stepped diameters providing a locating surface to position the bearing case in said stationary pump housing with the smaller stepped diameter being radially supported in the stationary housing, roller bearing means disposed in said bearing case radially inward of the smaller stepped diameter for rotatably supporting the drive shaft, seal means secured in and sealingly engaging said bearing case radially inward of the larger stepped diameter for sealingly engaging the pressure plate for preventing leakage of the high pressure hydraulic fluid adjacent said pressure plate from the interior of the pump housing, and annular end surfaces on said bearing case and seal means subjected to high pressure adjacent said pressure plate whereby said shoulder area is pressure loaded into abutment with said pump housing.

2. In combination, a high pressure hydraulic pump and a bearing and seal assembly comprising, a pump housing having a shaft opening, a nonrotatable pressure plate having a cylindrical surface, a rotatable drive shaft, a bearing and seal housing having an outer substantially cylindrical surface with a large diameter portion, a small diameter portion and an annular shoulder area between said diameter portions providing a locating surface to position the bearing and seal housing in said pump housing with the small diameter portion being radially supported in the shaft opening, roller bearing means disposed in said bearing and seal housing radially inward of the small diameter portion for rotatably supporting the drive shaft, seal means secured in and sealingly engaging said bearing and seal housing radially inward of the large diameter portion for sealingly engaging the cylindrical surface of said pressure plate member for preventing leakage of the high pressure hydraulic fluid adjacent said pressure plate from the interior of the pump housing, and annular end surfaces on said bearing case and seal means subjected to high pressure adjacent said pressure plate whereby said shoulder area is pressure loaded into abutment with said pump housing.

* * * * *